Dec. 16, 1941.  G. J. CALAME  2,266,306
APPARATUS FOR MAKING CUTTER BLADES
Filed April 12, 1939  2 Sheets-Sheet 1

INVENTOR
GORDON J. CALAME
BY
ATTORNEYS

Dec. 16, 1941.    G. J. CALAME    2,266,306
APPARATUS FOR MAKING CUTTER BLADES
Filed April 12, 1939    2 Sheets—Sheet 2
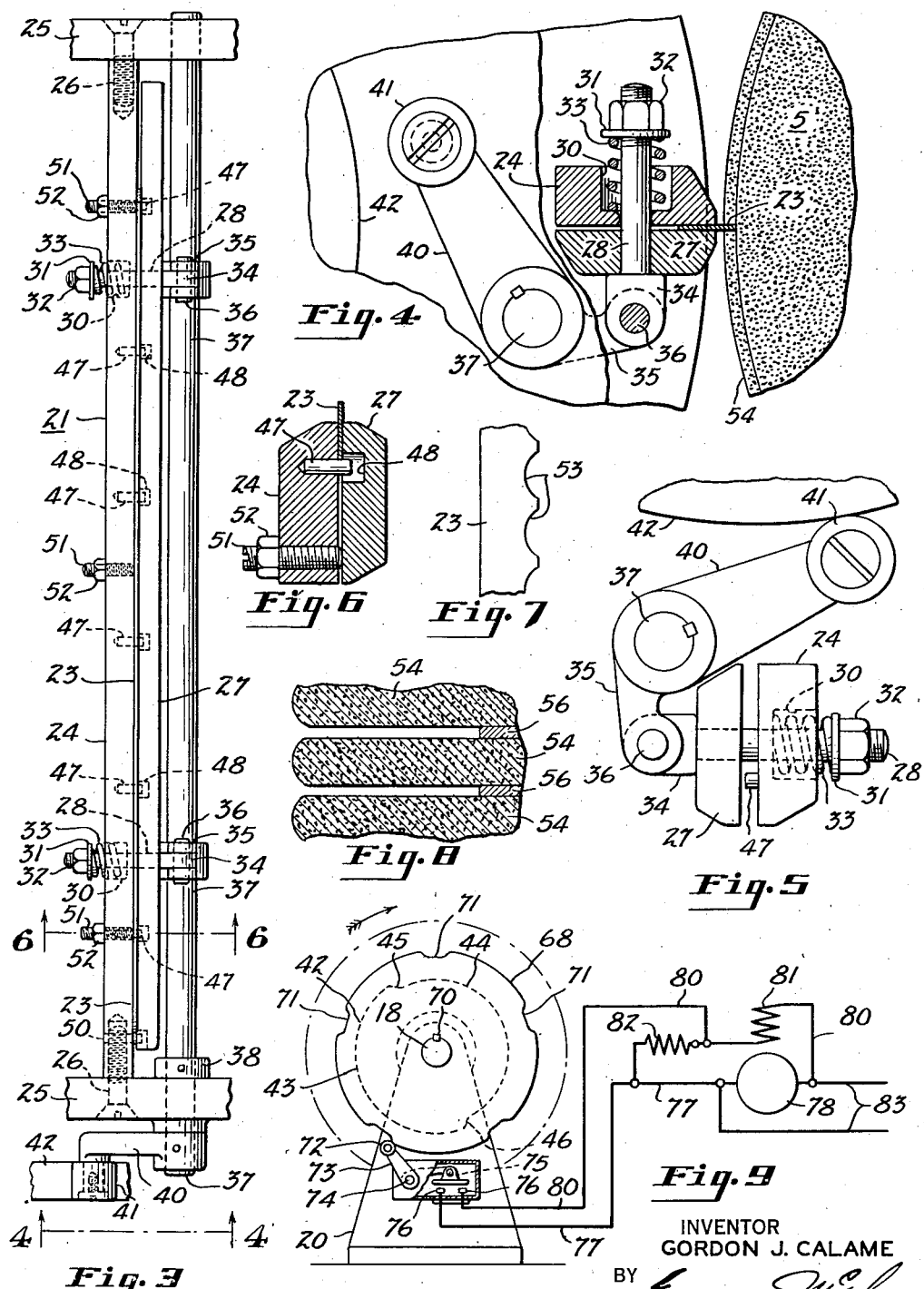
INVENTOR
GORDON J. CALAME
BY
Evans & McCoy
ATTORNEYS Patented Dec. 16, 1941

2,266,306

UNITED STATES PATENT OFFICE 2,266,306

APPARATUS FOR MAKING CUTTER BLADES

Gordon J. Calame, Bettendorf, Iowa

Application April 12, 1939, Serial No. 267,420

4 Claims. (Cl. 51—108)

This invention relates to the production of cutter blades and in particular to an apparatus for producing blades, such as, for example, those suitable for use in slicing products of a commercial bakery.

It has been found desirable in producing blades of the type mentioned to use harder blade materials so that blades may be provided with and may maintain especially sharp cutting edges for a longer time. However, when harder materials are used, fabrication difficulties are presented. For example, when the cutting edges of the blades are provided with a serrated configuration, a hard material is too brittle to undergo rough forming by stamping, punching, or other similar operations without increasing breakage due to fractures occurring in the metal. When forming is done by abrasive means, the harder materials tend to burn or crystallize unless relatively light cuts are taken. It is therefore an object of the present invention to provide a process of and apparatus for manufacturing blades whereby blades may be readily and efficiently fabricated from comparatively hard and brittle materials.

Another object is to provide apparatus for fabricating a large number of blades in a relatively short time, and at the same time minimizing manufacturing waste due to defective blades, thereby reducing the unit cost of blades.

A further object is to provide apparatus for rough-forming blades having configured cutting edges from thin metallic strips so that they may be produced in large quantities in a relatively short time.

A further object of the present invention is to provide an apparatus of the type mentioned which is simple in design and construction, inexpensive to manufacture, and which may be readily adjusted to form various sizes and different types of blades.

Other objects and advantages will become apparent from the following detailed description accompanied by the drawings, in which:

Fig. 3 is an enlarged fragmentary view, taken substantially on line 3—3 of Fig. 1, illustrating details of one form of mechanism suitable for holding one of the metal strips from which cutting blades are fabricated;

Fig. 4 is an enlarged sectional view taken substantially on line 4—4 of Fig. 3, showing how the metal strips are held when in contact with the forming member;

Fig. 5 is an enlarged view similar to Fig. 4, illustrating how the metal strips may be released;

Fig. 6 is an enlarged sectional view taken substantially on line 6—6 of Fig. 3, showing the means for properly locating the metal strips in the holding mechanism;

Fig. 7 is an enlarged fragmentary view of a metal strip which may be formed in accordance with the present invention;

Fig. 8 is an enlarged fragmentary section view taken substantially on line 8—8 of Fig. 1, showing details of the forming member; and Fig. 9 is a diagrammatic view of a mechanism which may be used to speed up the operation of the apparatus shown in Figs. 1 and 2.

Figure 1:
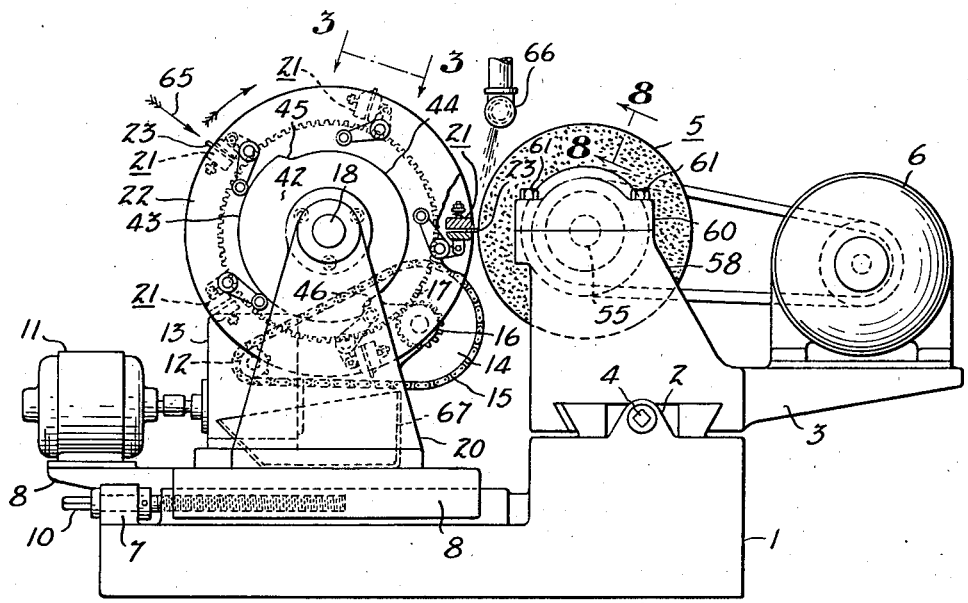
Figure 1 is an elevational view with parts broken away showing an embodiment of the present invention.
Figure 2:
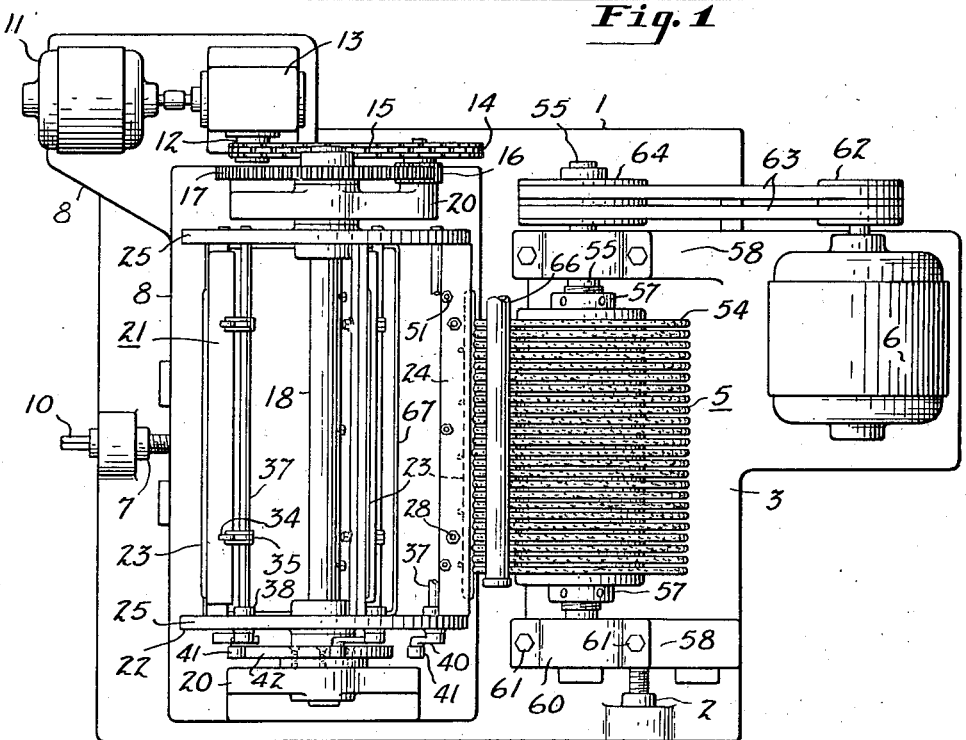
Fig. 2 is a plan view of the apparatus shown in Fig. 1.

In the accompanying drawings wherein like parts throughout the several views are indicated by the same reference numerals, Figs. 1 and 2 illustrate one embodiment of the present invention whereby blades having serrated or otherwise configured cutting edges may have such configurations formed into the thin, flexible metal strips called blade blanks. It is then only necessary to sharpen the cutting edges by any of the well known methods used in the art to provide finished blades.

In the device of the present invention blade blanks are inserted in holding means which travel in an endless path past an abrasive means which will form the desired configurations in the blade blanks, said holding means being arranged to securely hold the blanks when passing in the region of the abrasive means and to release the blanks after passing the abrasive means.

A suitable base for the apparatus used to carry out the invention is indicated in the drawings by the numeral 1. Along one side of the base 1 is provided a suitable slide mechanism 2 which is so constructed that a support member 3 may be moved therealong by turning a threaded adjusting screw 4 as is well known in the machine art. The support member 3 carries an abrasive means for forming the blades, indicated generally by the numeral 5, and a motor 6 for driving the abrasive means.

The base 1 also is provided with another suitable slide mechanism 7 similar to the slide mechanism 2 and adapted to move a support member 8 in a line disposed at right angles to the line of movement of the member 3 by turning a threaded adjusting screw 10. The support member 8 carries a motor 11 which rotates a pulley 12 through a suitable speed reducer 13. The pulley 12 drives a larger pulley 14 by means of an endless belt or chain 15. The pulley 14 is keyed to a stub shaft which also carries a pinion 16 which meshes with and drives a gear 17 carried by a shaft 18 journaled in extensions 20 of the support member 8.

A plurality of holding means, indicated generally by the numeral 21, are disposed circumferentially around a squirrel cage drum 22 which is carried by and rotated with the shaft 18 to carry blade blanks 23 disposed in the holding means past the abrasive means 5. As shown in Fig. 1, the drum 22 is constructed to carry five of the holding means 21 but it may be seen that as many blade holding units as desired may be provided on the drum. In fact, it is preferable from the standpoint of production to have as large a number of blade holding units as is practicable mounted on the drum in order that a large number of blades may be formed in a relatively short time.

Each of the individual blade holding units are substantially identical and comprises a stationary holding member 24 mounted between spaced disc-shaped ends 25 of the drum 22 and secured to the ends in any suitable fashion, as by screws 26 (Fig. 3). Disposed adjacent the member 24 is a movable holding member 27 which is shorter than the member 24 and does not extend to the drum ends 25. Firmly secured to the member 27 and extending therethrough are one or more pins 28 which also extend to and through countersunk apertures 30 in the stationary member 24. Each of the free ends of the pins 28 projecting through and beyond the member 24 is threaded and provided with a washer 31 and a nut 32 so that a coil spring 33 is compressed between the stationary member 24 and the washer 31. The force of the spring 33 exerted at one end against the surfaces of the member 24 in the countersunk portions of the aperture 30 and exerted at the other end against the pin 28 through the washer 31 and nut 32 normally urges the movable member 27 toward the stationary member 24. The end portion of the pin 28 extending through the member 27 on the side away from the member 24 is provided with an enlarged head 34 which is disposed in and pivotally mounted to the bifurcated ends of a short link 35 by means of the pin 36. The other end of the link 35 is keyed to and carried by a pivot shaft 37, which, looking at Fig. 3, is journaled in the drum ends 25 and extends beyond the lower of said drum ends. To prevent longitudinal movement of the shaft 37, a collar 38 is keyed thereto at a point just inside the drum end 25. Outside the drum end a cam lever 40 is carried by and keyed to the shaft 37 and is provided at its free end with a roller follower 41 having its axis disposed at right angles to the axis of the lever 40.

To actuate the blade holding units a stationary cam 42 is mounted on the shaft 18 between the drum end 25 and the shaft supporting projection 20 of the support member 8 shown in the lower portion of Fig. 2, the cam 42 being suitably secured as by screws to the projetcion 20. The outline of the stationary cam 42 may be seen in Fig. 1 and comprises two arcuate portions 43 and 44, respectively, of different radius connected by inclined or ramp portions 45 and 46. The arcuate surface of the cam portion 43 has a greater radius than the arcuate portion 44 and when one of the followers 41 is engaging the surface 43, its lever 40 is rotated in a clockwise diretcion, looking at Fig. 1, about the pivot shaft 37, so that the movable holding member 27 is held away from the stationary holding member 24 against the pressure of the spring 33, as is clearly shown in Fig. 5. This is the release position of the blade holding units which occurs when the follower contacts the cam surface 46 and the rotating of the lever 40 results. The movable member is held away from the stationary member during the period that the drum rotates from the surface 46 to the inclined portion 45 in a clockwise direction, looking at Fig. 1. When the follower reaches the portion 45 of the cam surface, and during the time that the follower is disposed over the surface 44, the lever 40 is free and the spring 33 causes the movable member 27 to move as close to the stationary member 24 as possible. Accordingly, when the follower 41 leaves the surface 43 of the cam 42 at the surface 45 and until it contacts the portion 46, the lever 40 is rotated in a counterclockwise direction and the holding units may securely clamp a blade blank 23 therein so that it may be held against and formed by the abrasive means 5, as shown in Fig. 4.

The bottom edges of each of the blade blanks 23 is held in proper position with respect to the stationary holding member 24 by means of locating pins 47 secured in the member 24 and extending between the members 24 and 27 into recesses 48 of the member 27. A locating pin 50 is similarly fixed in the member 24 to properly position one end of the blade blanks 23 (Fig. 3). By locating the bottom and one end portion of the blade blanks, blade blanks of various heights and lengths may be formed without a change in the holding units.

To provide thorough contact of the blade holding members with the blade blanks 23, one or more projections having a height equal to the thickness of the blade blanks are disposed along one of the contiguous surfaces of the holding members. In Fig. 6 such a projection may be seen disposed near the lower portion of the holding members. In this embodiment of the invention the projection is formed by a plurality of threaded pins 51 projecting through the stationary member 24 at spaced intervals and held in their proper places by lock nuts 52. These pins 51 are made adjustable so that the holding units may accommodate blade blanks of various thicknesses.

In the embodiment of the invention shown in the drawings the blade blanks 23 are thin, flexible, metallic strips. In the finished blade the cutting edges will have a serrated contour. Therefore, in the blade blank forming operation a plurality of spaced U-shaped scallops 53 are formed into one edge of the metallic strip, as shown in Fig. 7. To form these scallops the abrasive means indicated generally by the numeral 5 comprises a plurality of formed abrasive discs 54 having rounded peripheral edges complemental in outline to the scallops 53 (Figs. 7 and 8).

The discs 54 may be mounted on a shaft 55 and separated by suitable spacers 56, being kept in assembled relationship by means of collars 57 threadedly carried by the shaft 55. The shaft 55 may be journaled in suitable anti-friction bearings, which are carried partly in extensions 58 of the support member 3, the remainder of the bearing being held in place by a suitable cap 60 bolted to the extensions 58 by suitable bolts 61.

The abrasive discs 54 and the shaft 55 are rotatable by power transmitted from the motor 6 through one or more motor pulleys 62, one or more endless belts 63, and one or more pulleys 64 carried by and keyed to the shaft 55.

By mounting the abrasive means in the manner described, various types of configurations may be formed on the blade blanks as well as various sizes of serrations. In order to change the size or shape of the configurations it is only necessary to remove the bolts 61 and the caps 60, lift out the shaft 55, loosen and remove the collars 57 whereby the discs 54 and spacers 56 may be replaced by the desired discs and spacers and the abrasive means may be reassembled.

In the operation of the blade forming apparatus, the drum 22 may be continuously rotated at a relatively slow speed. Metal strips may be inserted and properly located between the blade holding members 24 and 27 just before the cam follower 41 leaves the high portion 43 of the stationary cam 42, that is, approximately in the location of the arrow 65 shown in Fig. 1. When the follower 41 leaves the cam surface 43 at the inclined surface 45, the metal strip is clamped in the holding unit and passed across the abrasive means 5, thereby forming the scallops 53 in one edge of the blade blank. It is desirable that while the blade blank is being formed that a stream of coolant be directed thereon, and such coolant may be pumped from a suitable reservoir (not shown) and be played against the blade blank from a suitable tube or conduit 66 having openings or spray nozzles therein. When the cam follower 41 contacts the inclined cam surface 46, the holding members separate, releasing the blade blank into a tray 67 from which they may be removed for sharpening at periodic intervals.

The scallops 53 are cut in the metal strip by the abrasive discs 54 during the movement of the strips past the peripheries of the discs and through the plane of the disc and work holder axes. The edge of the metal strip is engaged with the discs during movement of the strip through a small arc and, since each strip is held by the clamps substantially in a plane which includes the work holder axis and which is radial with respect to said axis, the strips are substantially normal to the peripheral surfaces of the discs when the full depth of cut is reached and have only a small amount of angular movement with respect to the peripheral surfaces of the disc during the cutting operation. By feeding strips to the cutting discs in this manner, a uniform and rapid cutting action is obtained without excessive heating of the metal strip.

In some instances it may be desirable to further speed up the production of formed blade blanks and Fig. 9 shows, diagrammatically, a mechanism, including a two speed motor, which may be used for this purpose.

In this mechanism the shaft 18 which carries the drum 22 and is journaled in extensions 20 of the support member 8 may be provided at one end with a cam member 68 keyed to the shaft 18, as indicated by the numeral 70. Fig. 9 is a diagrammatic representation in elevation looking at the drum portion of the blade blank forming apparatus in the same direction as Fig. 1, so that the drum 22 will rotate in a clockwise direction, looking at Fig. 9. The outline of the cam 70 is generally circular with a plurality of identical recessed portions 71 of the cam surface, one for each blade holding unit. These recesses 71 have a circumferential length approximately equal to the circumferential length during which the blade blanks are in engagement with the abrasive means, and are disposed around the periphery of the cam 68 so as to coincide with the blade blank forming zones. The cam 68 has a roller follower 72 mounted on one end of a lever 73 which is pivoted at 74. On the other side of the pivot point the lever 73 terminates in a switch or contact member 75 adapted to contact and close the circuit between the two contacts 76. As the drum 22 rotates, carrying with it the cam 68, the follower rides on the cam surface, keeping the contact member 75 spaced from the contacts 76. When the follower reaches one of the recesses 71, it enters the recess and pivots the lever 73 about the pivot point 74, and the member 75 closes the contact 76 for a purpose to be described shortly.

A conductor 77 from one of the contacts is connected to one side of an armature 78 of the shunt wound motor used to rotate the drum and indicated by the numeral 11 in Fig. 1. The other contact 76 is connected in series with a field coil 81 and to the other side of the armature 78 by a conductor 80. A resistance 82 is connected to the conductor 80 between the field coil 81 and the contact 76 and to the conductor 77 between the armature and the other contact 76. Line current is supplied to the terminals of the armature through suitable lines 83.

In the above hook-up the drum is driven at a relatively fast speed during the time that the blade blanks are out of contact with the abrasive means and at a relatively slower and suitable grinding speed when the blade blanks are being formed, that is, when the follower 72 is disposed in one of the recesses 71, because when the follower is in one of the recesses, the resistance 82 is shorted out and a higher current is supplied to the field coil of the motor, thus slowing down the speed. When the follower leaves one of the recesses 71 and rides on the normal cam surface, the field current is lowered due to the resistance 82, which results in a higher motor speed.

By making the resistance 82 of a proper predetermined amount, the production of the apparatus may be increased considerably due to the fact that the necessarily slow grinding speeds are only used when the forming of the blade blank is actually being done.

Thus it may be seen that by the present invention a large number of superior blades may be turned out in a relatively short time. In one particular instance two different lots of serrated blades composed of two steels having different hardnesses were produced. Blades of the softer steel were produced by stamping or punching the blade blanks and sharpening them on present commercial machines, while blades of the harder steel were formed according to the present invention and sharpened by a conventional blade grinding machine. Aside from the increases in production speed obtained, it was found that breakage during fabrication was materially reduced and it was possible to produce on a commercial scale a blade which was 30 to 50% sharper, due to the use of the harder materials which are too brittle to be formed by stamping or punching. Of course, the harder materials will stay sharp for a longer period of time than softer materials.

It may be noted that the present invention is also very advantageous in the production of bars or strips having notched or serrated edges for various uses, regardless of whether the strips are composed of relatively hard or soft material.

It is to be understood that the specific devices and process steps shown and described herein for purposes of illustration and explanation may be modified without departing from the spirit of the present invention.

What I claim is:

1. Apparatus for cutting serrations and the like in the edges of metallic strips, which comprises a series of spaced abrading elements of substantially the same diameter mounted to rotate about a fixed axis, means for continuously rotating said elements, a work holder mounted to rotate about a fixed axis parallel to the axis of said elements, means for rotating the work holder, a plurality of clamps carried by the work holder, each clamp having strip clamping jaws provided with elongated strip engaging faces disposed parallel to the work holder axis and adapted to grip a metallic strip inwardly of its outer edge and to rigidly hold the strip in a plane radial with respect to the work holder axis and with its outer edge parallel to the work holder axis and at a distance therefrom greater than the distance from said axis to the peripheries of said elements whereby spaced notches are cut in said strips as they are moved past said elements during rotation of said work holder.

2. Apparatus for cutting serrations and the like in the edges of metallic strips, which comprises a series of spaced abrading elements of substantially the same diameter mounted to rotate about a fixed axis, means for continuously rotating said elements, a work holder mounted to rotate about a fixed axis parallel to the axis of said elements, means for rotating the work holder, a plurality of clamps carried by the work holder, each clamp having strip clamping jaws provided with elongated strip engaging faces disposed parallel to the work holder axis and adapted to grip a metallic strip inwardly of its outer edge and to rigidly hold the strip in a plane radial with respect to the work holder axis and with its outer edge parallel to the work holder axis and at a distance therefrom greater than the distance from said axis to the peripheries of said elements, whereby spaced notches are cut in said strips as they are moved past said elements during rotation of said work holder, and means for automatically actuating said clamps to grip and release strips at predetermined points in the path of rotation of said work holder.

3. Apparatus for cutting serrations and the like in the edges of metallic strips, which comprises a series of spaced abrading elements of substantially the same diameter mounted to rotate about a fixed axis, means for continuously rotating said elements, a work holder mounted to rotate about a fixed axis parallel to the axis of said elements, means for rotating the work holder, a plurality of clamps carried by the work holder, each of said clamps including a stationary holding member disposed substantially parallel to the axis of the work holder at the periphery thereof, and a movable holding member cooperatively disposed adjacent the stationary member with means to move the movable member toward and away from the stationary member, said stationary and movable members providing strip clamping jaws adapted to grip a metallic strip with the plane of the strip disposed in a plane radial with respect to the work holder axis and its outer edge parallel to the work holder axis and at a distance therefrom greater than the distance from said axis to the peripheries of said elements, whereby spaced notches are cut in said strips as they are moved past said elements during rotation of said work holder.

4. Apparatus for cutting serrations and the like in the edges of metallic strips, which comprises a series of spaced abrading elements mounted to rotate about a fixed axis, means for continuously rotating said elements, a work holder mounted for movement about an axis parallel to the axis of the abrading elements and spaced from the peripheries of said elements, said work holder having a pair of strip clamping jaws provided with elongated strip engaging faces extending longitudinally of the work holder axis and adapted to grip a metallic strip inwardly of its outer edge and hold the strip substantially in a plane which includes the work holder axis with its outer edge positioned for engagement with said abrading elements, means for actuating said clamps to grip and release the strips, and means for actuating the work holder to move said jaws and strip about the work holder axis and through the plane of the axes of the work holder and abrading elements to cause the abrading elements to engage the edge of said strip and cut spaced notches therein during movement of the strip past the peripheral faces of said abrading elements.

GORDON J. CALAME.